US012523063B2

(12) United States Patent
Huang

(10) Patent No.: US 12,523,063 B2
(45) Date of Patent: Jan. 13, 2026

(54) REKEYABLE LOCK

(71) Applicant: TAIWAN FU HSING INDUSTRIAL CO., LTD., Kaohsiung (TW)

(72) Inventor: Fu-Chih Huang, Kaohsiung (TW)

(73) Assignee: TAIWAN FU HSING INDUSTRIAL CO., LTD., Kaohsiung (TW)

(*) Notice: Subject to any disclaimer, the term of this patent is extended or adjusted under 35 U.S.C. 154(b) by 48 days.

(21) Appl. No.: 18/627,075

(22) Filed: Apr. 4, 2024

(65) Prior Publication Data

US 2024/0344356 A1 Oct. 17, 2024

(30) Foreign Application Priority Data

Apr. 14, 2023 (TW) ................................ 112203477

(51) Int. Cl.
*E05B 27/00* (2006.01)

(52) U.S. Cl.
CPC ........ *E05B 27/005* (2013.01); *E05B 27/0017* (2013.01)

(58) Field of Classification Search
CPC . E05B 27/005; E05B 27/0017; E05B 27/0021
USPC ........................................................ 70/336
See application file for complete search history.

(56) References Cited

U.S. PATENT DOCUMENTS 1,414,348 A * 5/1922 Morris .................. E05B 27/001 70/419
2,620,649 A * 12/1952 Domingo ................ E05B 27/00 70/358
2,877,638 A * 3/1959 Vincent ............... E05B 27/0014 70/371
2,949,762 A * 8/1960 Johnstone ............... E05B 29/00 70/495
2,977,786 A * 4/1961 Marron ...................... E05B 9/04 70/379 R
4,138,870 A * 2/1979 Poirier .................... E05B 27/00 70/DIG. 62
4,531,389 A * 7/1985 Foshee ................ E05B 17/0004 70/385
4,531,390 A * 7/1985 Best .................... E05B 27/0014 70/385
4,689,978 A * 9/1987 Drummond ............. E05B 29/00 D8/343
4,732,023 A * 3/1988 Shen ..................... E05B 27/005 70/378

(Continued)

*Primary Examiner* — Nathan Cumar
(74) *Attorney, Agent, or Firm* — MUNCY, GEISSLER, OLDS & LOWE, P.C.

(57) ABSTRACT

A lock includes a lock casing having a lock cylinder hole, a pin replacing hole and a plurality of first pin holes; a lock cylinder rotatably arranged in the lock cylinder hole and formed with a plurality of second pin holes; a pin set including a plurality of first pins respectively accommodated in the first pin holes, and a plurality of second pins respectively accommodated in the second pin holes; an outer casing having an inner wall defining an accommodation space for accommodating the lock casing; and a pin plug including a main body having a first side abutting against the lock casing and a second side abutting against the inner wall, and a protruded block protruded from the first side for closing the pin replacing hole. The second side is opposite to the first side, and a shape of the second side corresponds to the inner wall.

10 Claims, 9 Drawing Sheets

(56) References Cited

U.S. PATENT DOCUMENTS 4,850,210 A * 7/1989 Adler .................... E05B 9/086 70/383
5,038,589 A * 8/1991 Martin .................... E05B 9/084 70/375
5,617,750 A * 4/1997 Preddey .............. E05B 27/0042 70/495
5,704,234 A * 1/1998 Resch .................... E05B 9/086 70/416
6,532,782 B2 * 3/2003 Chiu .................... E05B 9/086 70/369
6,951,123 B2 * 10/2005 Chong .................. E05B 27/005 70/370
7,121,127 B1 * 10/2006 Fan .................... E05B 27/005 70/370
7,448,239 B1 * 11/2008 Huang .................. E05B 27/005 70/495
7,448,240 B1 * 11/2008 Huang .................. E05B 29/004 70/495
7,552,608 B2 * 6/2009 Field .................. E05B 19/0029 70/420
8,117,876 B2 * 2/2012 Mathachan ........... E05B 27/005 70/495
8,707,746 B1 * 4/2014 Liu .................... E05B 27/005 70/385
10,273,716 B2 * 4/2019 Huang ................ E05B 27/0021
2002/0148263 A1 * 10/2002 Chiu .................... E05B 9/086 70/369
2004/0172994 A1 * 9/2004 Chong .................. E05B 27/005 70/493
2004/0221630 A1 * 11/2004 Herdman .............. E05B 27/005 70/382
2007/0017264 A1 * 1/2007 Seliber ................ E05B 27/0053 70/340
2007/0193317 A1 * 8/2007 Herdman ............ E05B 27/0057 70/383
2008/0223097 A1 * 9/2008 Field .................. E05B 27/0032 70/494
2008/0276673 A1 * 11/2008 Huang .................... E05B 31/00 70/490
2009/0277234 A1 * 11/2009 Huang .................. E05B 29/004 70/357
2009/0277236 A1 * 11/2009 Huang .................. E05B 29/004 70/385
2009/0277240 A1 * 11/2009 Huang .................. E05B 29/004 70/493
2010/0018267 A1 * 1/2010 Huang .................. E05B 29/004 70/449
2011/0154872 A1 * 6/2011 Huang .................. E05B 27/005 70/384
2011/0226027 A1 * 9/2011 Huang .................. E05B 29/004 70/374
2013/0086958 A1 * 4/2013 Emory ................ E05B 29/0046 70/357
2014/0020440 A1 * 1/2014 Herdman .............. E05B 27/005 70/375
2014/0069156 A1 * 3/2014 Romero ................ E05B 27/005 70/385
2014/0331726 A1 * 11/2014 Herdman .............. E05B 27/005 70/490
2016/0376814 A1 * 12/2016 Walls .................. E05B 27/0057 70/352
2020/0318388 A1 10/2020 Farag et al.
2024/0229507 A1 * 7/2024 Farag .................. E05B 27/0053
2024/0271462 A1 * 8/2024 Huang ................ E05B 27/0053
2024/0344356 A1 * 10/2024 Huang ................ E05B 27/0017

* cited by examiner

REKEYABLE LOCK

BACKGROUND OF THE INVENTION

1. Field of the Invention

The present invention relates to a lock, and more particularly, to a rekeyable lock.

2. Description of the Prior Art

Generally, a lock comprises a plurality of pins in a lock cylinder to work with a key in order to perform locking and unlocking operations. For example, when heights of teeth of the key corresponds to variances in length of the pins in the lock cylinder, the key can rotate the lock cylinder to perform locking and unlocking operations; when heights of teeth of the key does not correspond to variances in length of the pins in the lock cylinder, the key cannot rotate the lock cylinder to perform locking and unlocking operations. For requirements of replacing the key, the lock cylinder in the lock of the prior art must be pulled out to dissemble related components for replacing the pins. The process of replacing the pins in the lock cylinder of the lock of the prior art is complex and difficult. On the other hand, in order to prevent the pins in the lock cylinder from falling out when the lock cylinder is rotated by the key, the lock of the prior art comprises a pin plug to block the pins. However, the pin plug of the lock of the prior art is easy to be pushed out by the pins, such that the pins in the lock cylinder may fall out, so as to cause the lock to fail to function properly.

SUMMARY OF THE INVENTION

A rekeyable lock of the present invention comprises a lock casing, a lock cylinder, a pin set, an outer casing and a pin plug. The lock casing is formed with a lock cylinder hole, a pin replacing hole and a plurality of first pin holes. The lock cylinder is rotatably arranged in the lock cylinder hole. The lock cylinder is formed with a plurality of second pin holes. The second pin holes are communicated with the first pin holes respectively when the lock cylinder is located at a first position relative to the lock casing, and the second pin holes are communicated with the pin replacing hole when the lock cylinder is located at a second position relative to the lock casing. The pin set comprises a plurality of first pins respectively accommodated in the first pin holes, and a plurality of second pins respectively accommodated in the second pin holes. The outer casing has an inner wall defining an accommodation space for accommodating the lock casing. The pin plug comprises a main body and a protruded block. The main body has a first side configured to abut against the lock casing, and a second side configured to abut against the inner wall of the outer casing. The second side is opposite to the first side, and a shape of the second side corresponds to the inner wall. The protruded block is protruded from the first side and configured to be inserted into the pin replacing hole for closing the pin replacing hole.

In an embodiment of the present invention, the pin set further comprises a plurality of springs respectively accommodated in the plurality of first pin holes and configured to pushes the plurality of first pins toward the lock cylinder, and a plurality of spring plugs respectively fixed in the plurality of first pin holes and configured to abut against the plurality of springs.

In an embodiment of the present invention, the first side of the main body is formed with a groove adjacent to the protruded block.

In an embodiment of the present invention, a width of the main body of the pin plug is greater than a width of the protruded block of the pin plug.

In an embodiment of the present invention, the rekeyable lock further comprises a sticker attached to the lock casing and the second side of the main body for fixing the pin plug to the lock casing.

In an embodiment of the present invention, a top part of the lock casing is formed with the plurality of first pin holes, and a bottom part of the lock casing is formed with the pin replacing hole.

In an embodiment of the present invention, the pin plug is made of an elastic material.

In an embodiment of the present invention, the rekeyable lock further comprises a transmission rod connected to the lock cylinder and configured to be rotated along with the lock cylinder.

In an embodiment of the present invention, the lock cylinder is further formed with a key hole communicated with the plurality of second pin holes.

In an embodiment of the present invention, the inner wall of the outer casing defines a cylindrical accommodation space, an outer side of the lock casing is formed with a first arc surface and a notch, the pin replacing hole is formed on the notch, the second side of the main body of the pin plug is formed with a second arc surface, the first arc surface and the second arc surface correspond to the cylindrical accommodation space In contrast to the prior art, the lock cylinder of the rekeyable lock of the present invention does not need to be pulled out to dissemble related components for replacing the second pins with the new second pins. Therefore, the rekeyable lock of the present invention can simplify the replacing process of the second pins and shorten replacing time. Moreover, the pin plug of the present invention can be fixed to the lock casing more stably, in order to prevent the pin plug from being detached from the lock casing.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
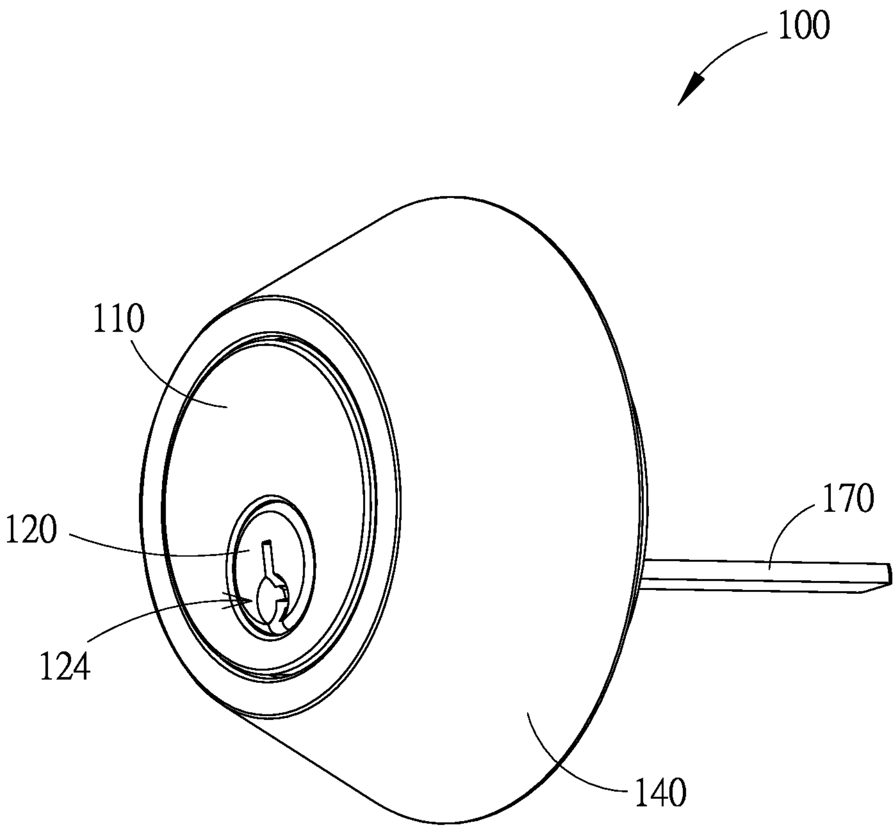
FIG. 1 is a diagram showing a rekeyable lock of the present invention.
Figure 2:
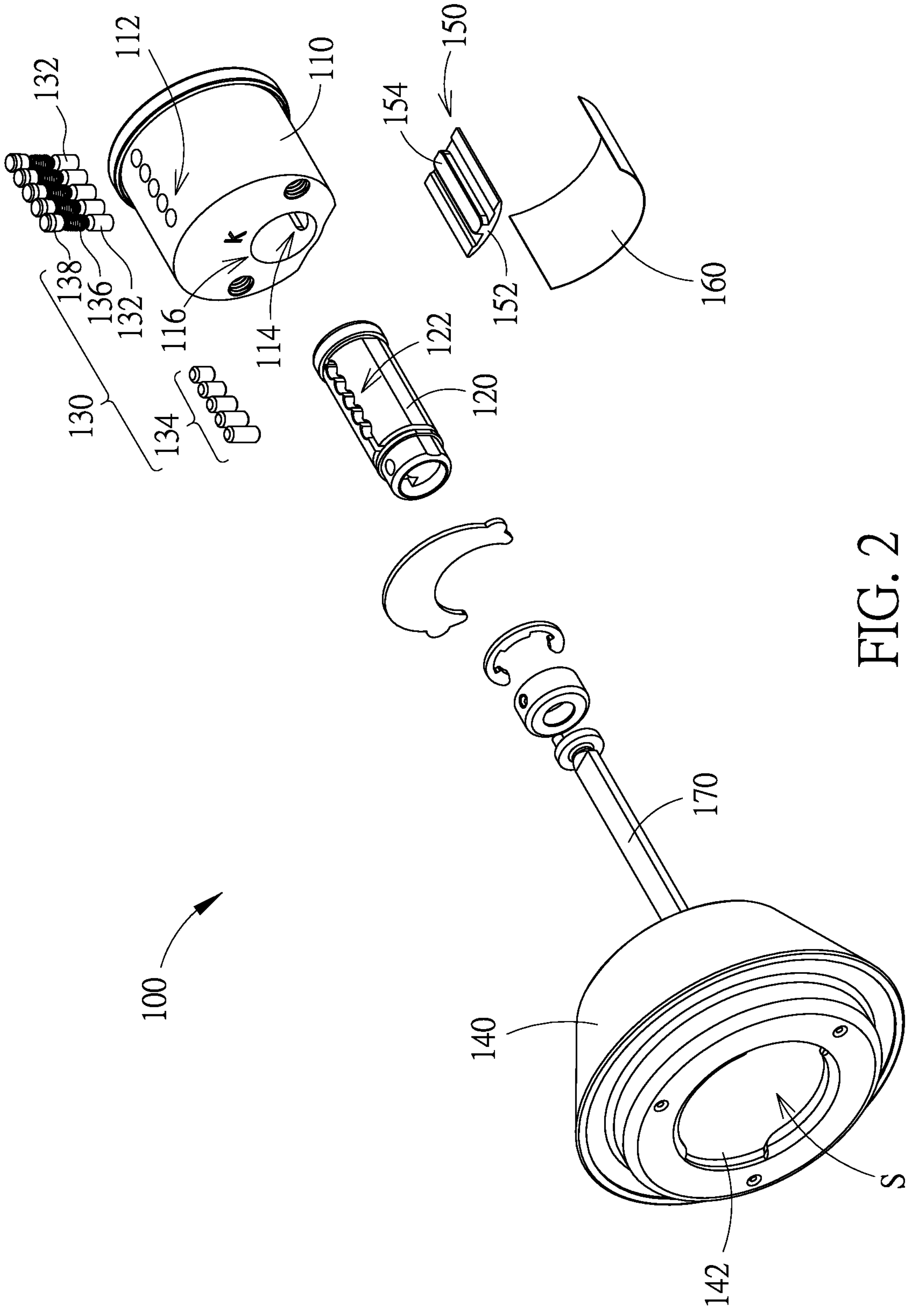
FIG. 2 is an exploded view of the rekeyable lock of the present invention.
Figure 3:
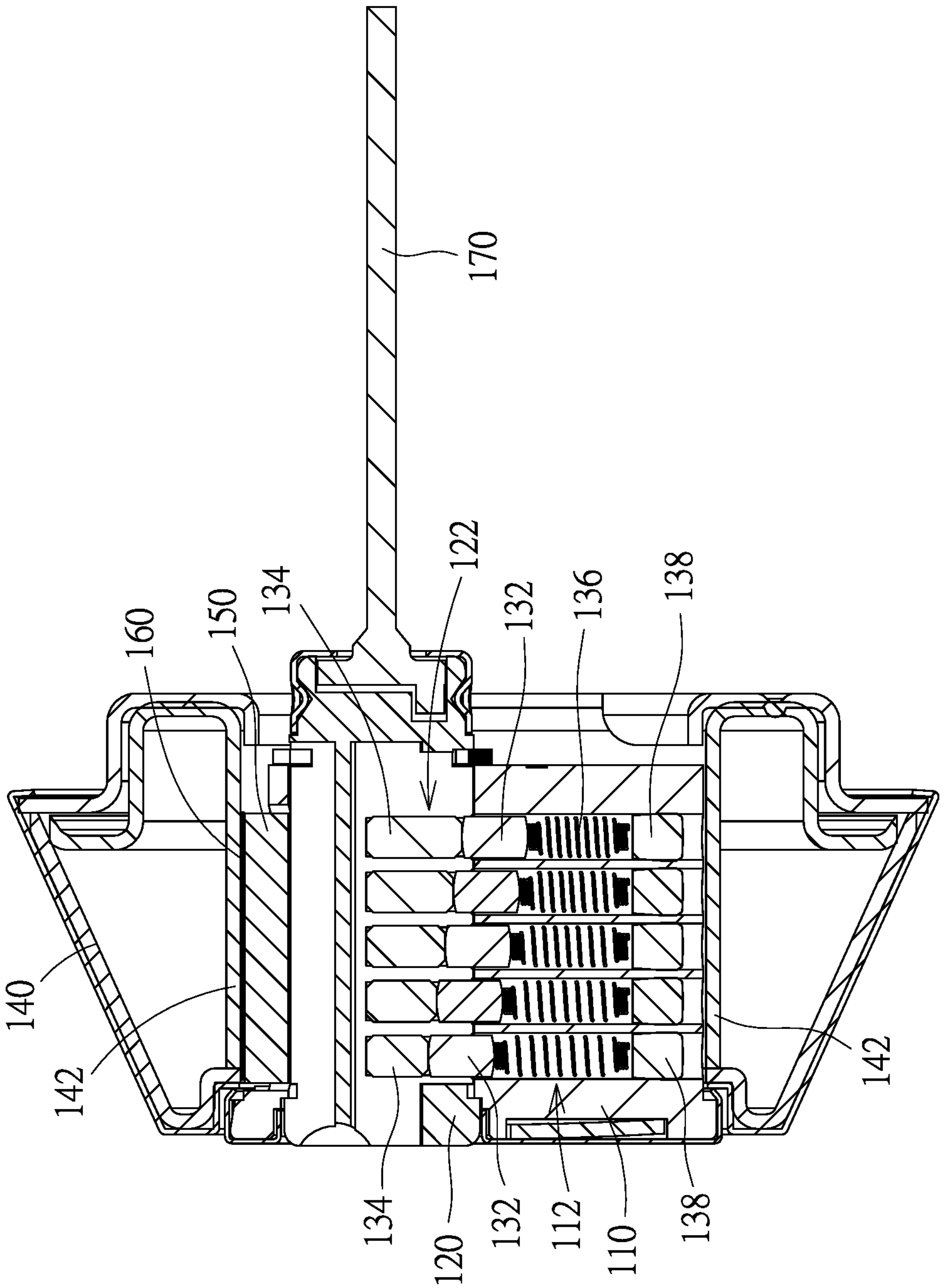
FIG. 3 is a cross-sectional view of the rekeyable lock of the present invention.
Figure 4:
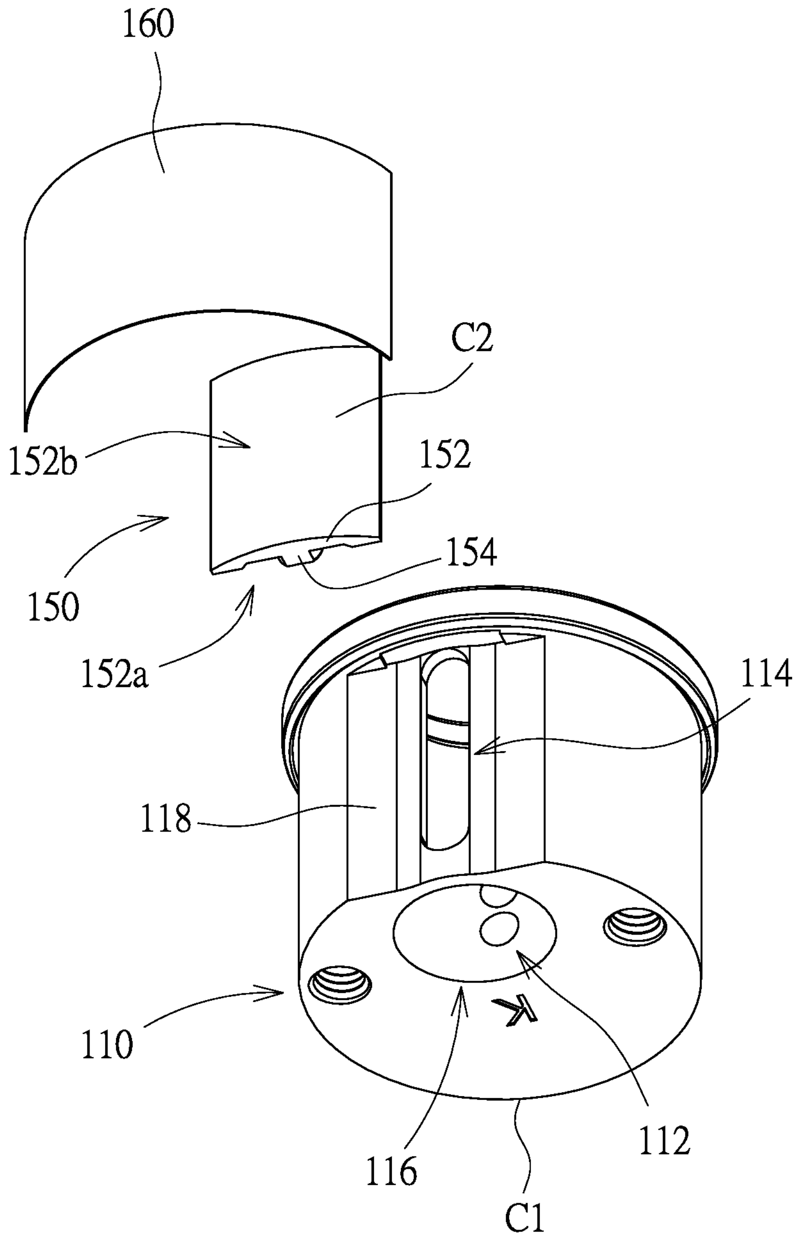
FIG. 4 is a diagram showing a lock cylinder and a pin plug of the rekeyable lock of the present invention.
Figure 5:
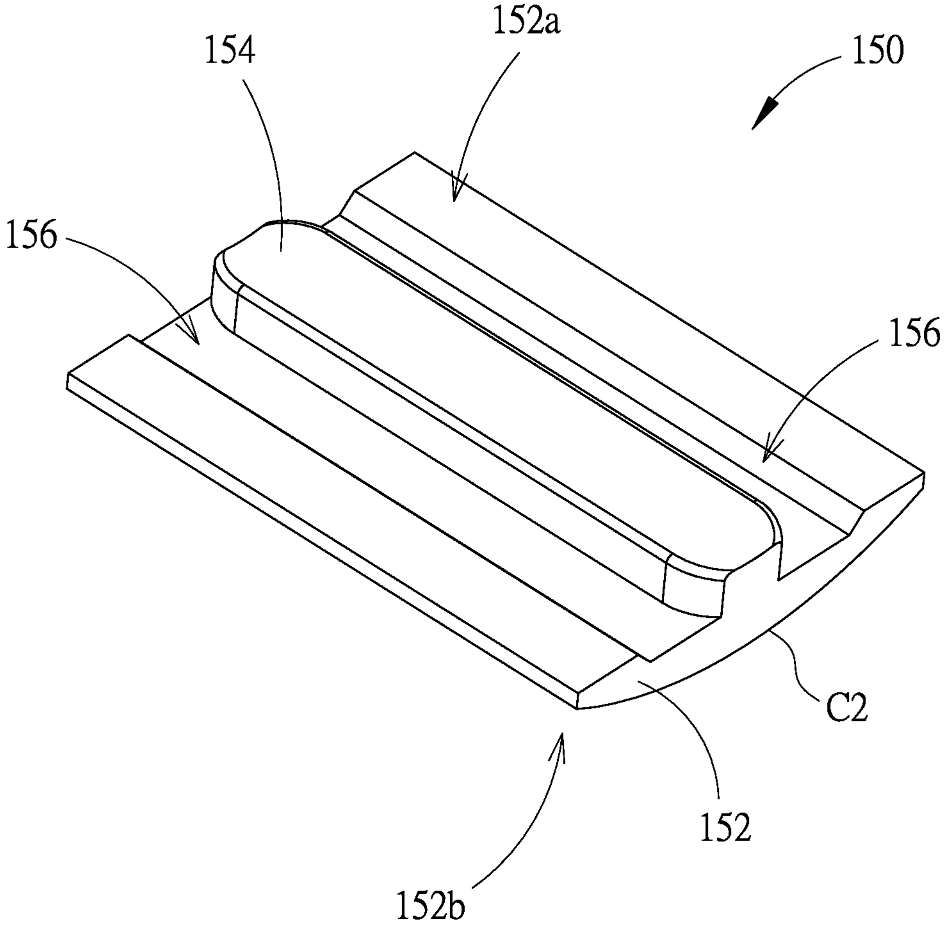
FIG. 5 is a diagram showing the pin plug of the present invention.

Please refer to FIG. 1 to FIG. 5. FIG. 1 is a diagram showing a rekeyable lock of the present invention, FIG. 2 is an exploded view of the rekeyable lock of the present invention, FIG. 3 is a cross-sectional view of the rekeyable lock of the present invention, FIG. 4 is a diagram showing a lock cylinder and a pin plug of the rekeyable lock of the present invention, and FIG. 5 is a diagram showing the pin plug of the present invention. As shown in figures, the rekeyable lock 100 of the present invention comprises a lock casing 110, a lock cylinder 120, a pin set 130, an outer casing 140 and a pin plug 150. A top part of the lock casing 110 is formed with a plurality of first pin holes 112, a bottom part of the lock casing 110 is formed with a pin replacing hole 114, and a middle part of the lock casing 110 is formed with a lock cylinder hole 116. The lock cylinder hole 116 is communicated with the first pin holes 112 and the pin replacing hole 114. The lock cylinder 120 is rotatably arranged in the lock cylinder hole 116. The lock cylinder 120 is formed with a plurality of second pin holes 122 corresponding to the plurality of first pin holes 112. The lock cylinder 120 is further formed with a key hole 124 communicated with the plurality of second pin holes 122. The key hole 124 allows a key to insert therein.

The pin set 130 comprises a plurality of first pins 132, a plurality of second pins 134, a plurality of springs 136 and a plurality of spring plugs 138. The plurality of first pins 132 are respectively accommodated in the first pin holes 112. Lengths of the first pins 132 are identical. The plurality of springs 136 are respectively accommodated in the first pin holes 116 and configured to push the plurality of first pins 132 toward the lock cylinder 120. The plurality of spring plugs 138 are respectively fixed in the plurality of first pin holes 112 and configured to abut against the plurality of springs 136. The plurality of second pins 134 are respectively accommodated in the second pin holes 122. Lengths of the second pins 134 can be different to correspond to heights of teeth of a key. When the key hole 124 is not inserted with a key, the springs 136 are configured to push the first pins 112 toward the lock cylinder 120, such that portions of the first pins 112 extend into the second pin holes 122. As such, the lock cylinder 120 is not able to rotate relative to the lock casing 110.

The outer casing 140 has an inner wall 142 defining an accommodation space S for accommodating the lock casing 110. The pin plug 150 comprises a main body 152 and a protruded block 154. In the present embodiment, the pin plug 150 is made of an elastic material. A width of the main body 152 is greater than a width of the protruded block 154. The main body 152 of the pin plug 150 has a first side 152*a* and a second side 152*b*. The second side 152*b* is opposite to the first side 152*a*. The protruded block 154 is protruded from the first side 152*a* of the main body 152 and configured to be inserted into the pin replacing hole 114 for closing the pin replacing hole 114.

On the other hand, the rekeyable lock 100 of the present invention can further comprise a sticker configured to be attached to the lock casing 110 and the second side 152*b* of the main body 152 for fixing the pin plug 150 to the lock casing 110. Moreover, the width of the protruded block 154 of the pin plug 150 can be slightly greater than a width of the pin replacing hole 114, such that the pin plug 150 can be fixed to the lock casing 110 more stably. Further, the protruded block 154 and a wall of the pin replacing hole 114 can be formed with corresponding structures respectively in order to fix the pin plug 150 to the lock casing 110 more stably. For example, a protruded structure can be formed on the wall of the pin replacing hole 114, and a corresponding recessed structure can be formed on the protruded block 154 (and vice versa). When the protruded block 154 is inserted into the pin replacing hole 114, the protruded structure is configured to be engaged with the recessed structure in order to fix the pin plug 150 to the lock casing 110 more stably.

Figure 6:
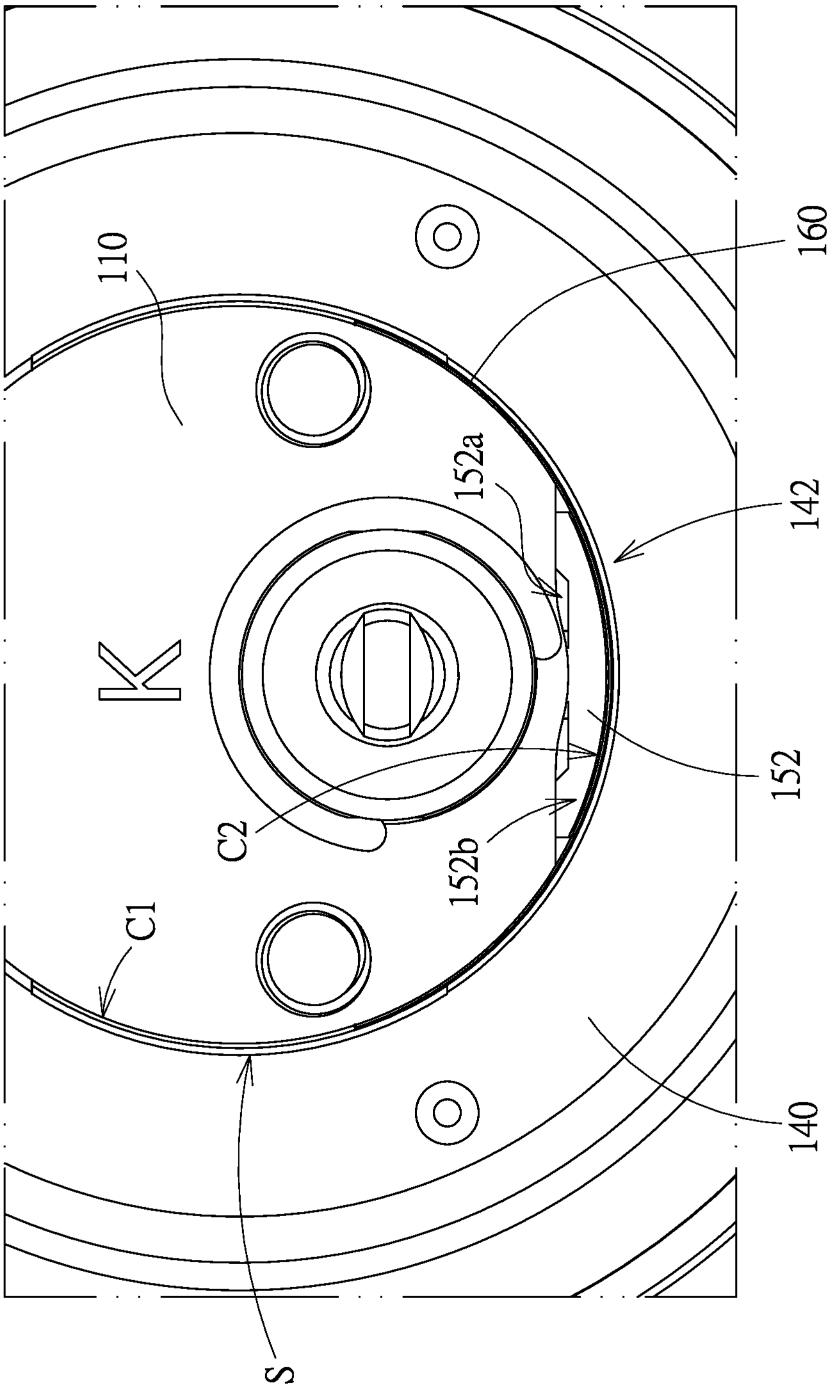
FIG. 6 is a diagram showing a portion of the rekeyable lock of the present invention.

Please refer to FIG. 6, and refer to FIG. 1 to FIG. 5 as well. FIG. 6 is a diagram showing a portion of the rekeyable lock of the present invention. As shown in figures, a shape of the second side 152*b* of the main body 152 of the pin plug 150 corresponds to the inner wall 142 of the outer casing 140. When the lock casing 110 and the pin plug 150 are accommodated in the accommodation space S surrounded by the inner wall 142 of the outer casing 140, the pin plug 150 is located between the lock casing and the inner wall 142 of the outer casing 140. The first side 152*a* of the main body 152 of the pin plug 150 is configured to abut against the lock casing, and the second side 152*b* of the main body 152 of the pin plug 150 is configured to abut against the inner wall 142 of the outer casing 140. According to the above arrangement, the pin plug 150 can be fixed to the lock casing 110 more stably, in order to prevent the pin plug 150 from being detached from the lock casing 110.

In addition, the first side 152*a* of the main body 152 is formed with at least one groove 156 adjacent to the protruded block 154. In the present embodiment, the first side 152*a* of the main body 152 is formed with two grooves 156 adjacent to the protruded block 154, but the present invention is not limited thereto. When the protruded block 154 is inserted into the pin replacing hole 114, the grooves 156 allow the protruded block 154 to have greater moving space, such that the pin plug 154 can be inserted into the pin replacing hole 114 more stably. Moreover, the grooves 156 also allow a user to remove the pin plug 150 from the lock casing easily.

Figure 7:
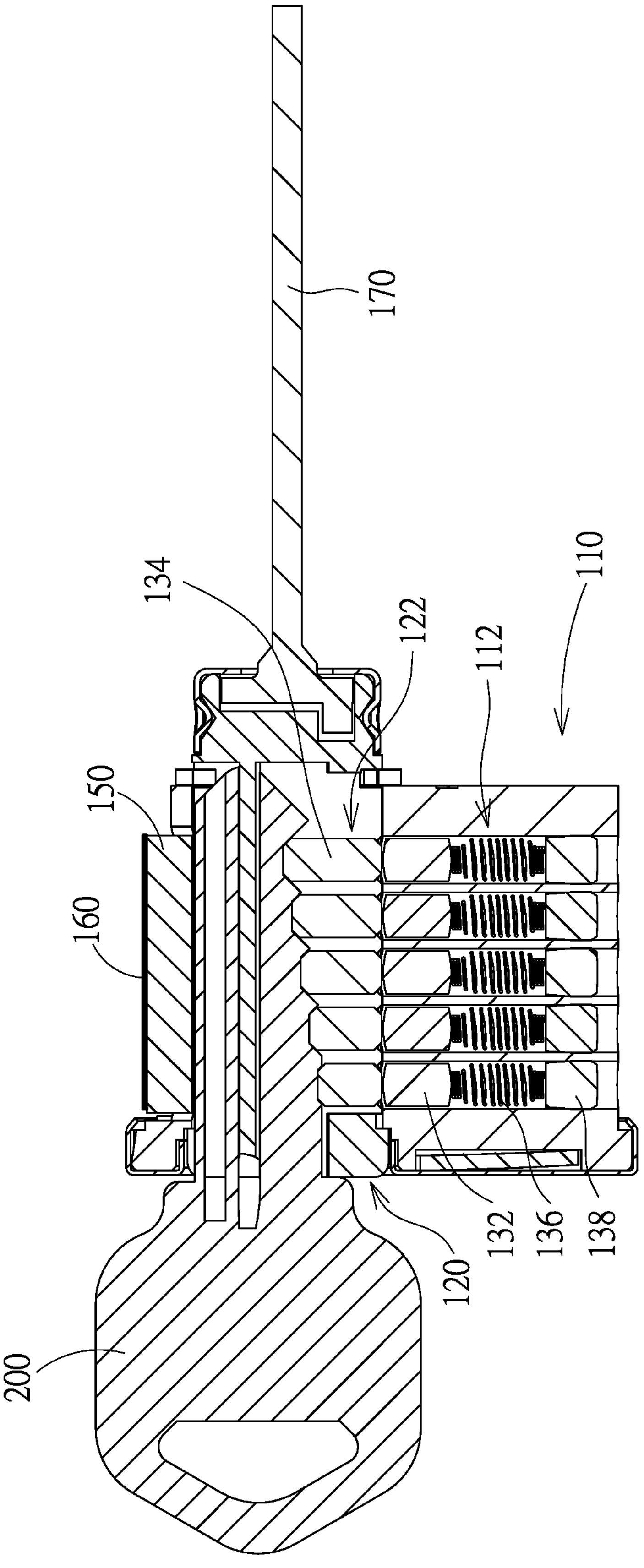
FIG. 7 is a diagram showing a key being inserted into the rekeyable lock of the present invention.
Figure 8:
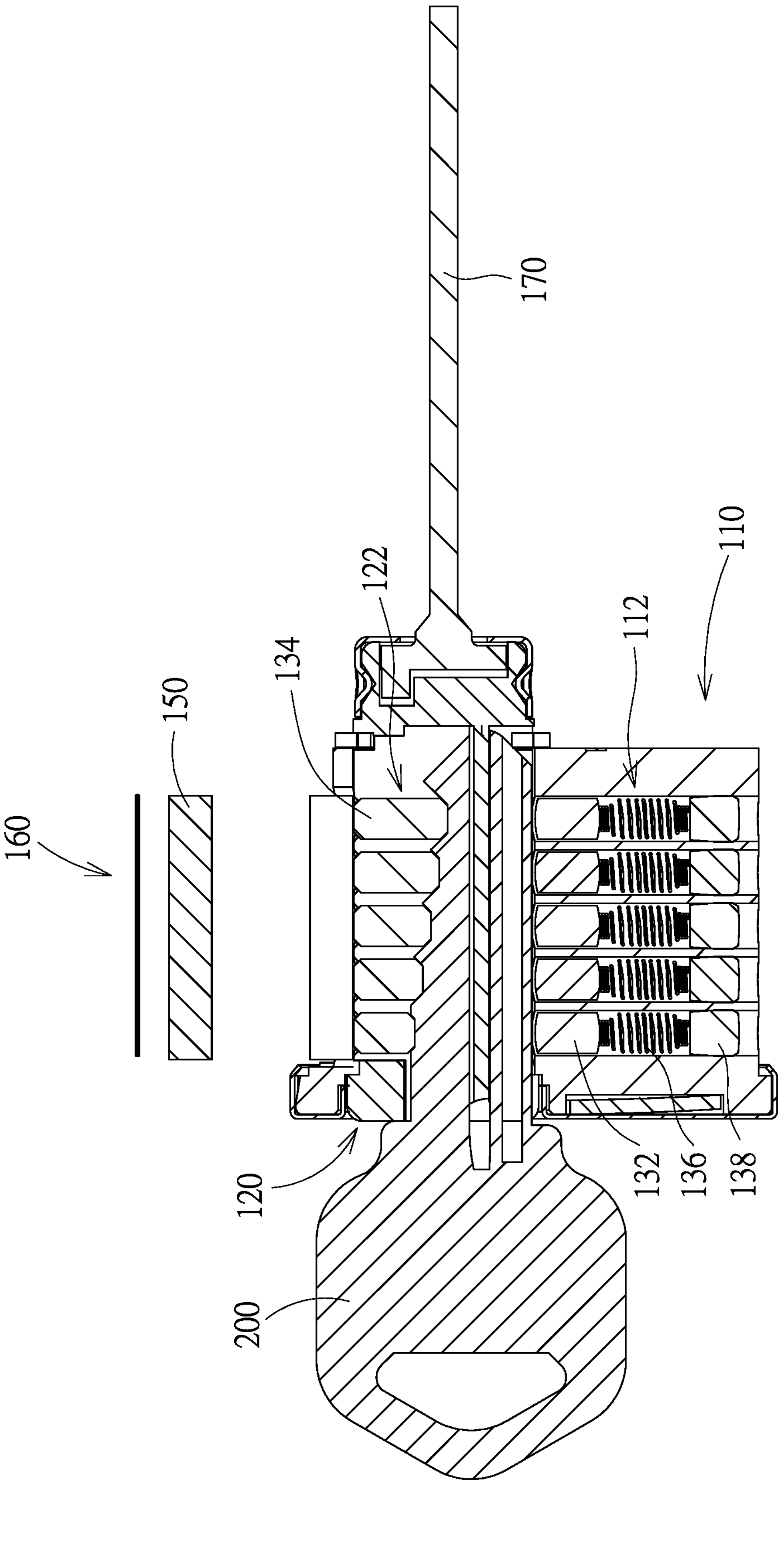
FIG. 8 is a diagram showing the rekeyable lock of the present invention replacing pins.

Please refer to FIG. 7 and FIG. 8, and refer to FIG. 1 to FIG. 6 as well. FIG. 7 is a diagram showing a key being inserted into the rekeyable lock of the present invention, and FIG. 8 is a diagram showing the rekeyable lock of the present invention replacing pins. As shown in figures, when a key 200 is inserted into the key hole 124, the first pins 112 no longer extend into the second pin holes 122 since heights of teeth of the key 200 correspond to the lengths of the second pins 134, such that the lock cylinder 120 is rotatable relative to the lock casing 110. In FIG. 7, the lock cylinder 120 is located at a first position relative to the lock casing 110. In FIG. 8, the lock cylinder 120 is located at a second position relative to the lock casing 110. When the lock cylinder 120 is located at the first position relative to the lock casing 110, the plurality of second pin holes 122 are communicated with the first pin holes 112 respectively. When the lock cylinder 120 is located at the second position relative to the lock casing 110, the plurality of second pin holes 122 are communicated with the pin replacing hole 114.

When the user is going to replace the second pins 134, the lock casing 110 is first pulled out from the accommodation space S of the outer casing 140. Thereafter, the key 200 is inserted into the key hole 124 of the lock cylinder 120, and the user can use the key 200 to rotate the lock cylinder 120 to move from the first position (as shown in FIG. 7) to the second position (as shown in FIG. 8), such that the plurality of second pin holes 122 are communicated with the pin replacing hole 114. The user thus can sequentially remove the sticker 160 and the pin plug 150 from the lock casing 110 to expose the pin replacing hole 114. As such, the user can take out the second pins 134 through the pin replacing hole 114. The user can then insert a new key, replace the second pins 134 with new second pins, insert the pin plug 150 into the pin replacing hole 114, and attach the sticker 160. Thereafter, the user can use the new key to rotate the lock cylinder 120 to move from the second position to the first position, and put the lock casing 110 into the accommodation space S of the outer casing 140 to complete the replacement of second pins in the lock cylinder 120, such that the new second pins can work with the new key.

According to the above arrangement, in order to replace the second pins 134 of the rekeyable lock 100 of the present invention, the user only needs to pull out the lock casing 110 from the accommodation space S of the outer casing 140, use the key 200 to rotate the lock cylinder 120, remove the pin plug 150 from the lock casing, and then take out the second pins 134 through the pin replacing hole 114. The lock cylinder 120 of the rekeyable lock 100 of the present invention does not need to be pulled out to dissemble related components for replacing the second pins 134. Therefore, the rekeyable lock 100 of the present invention can simplify the replacing process of the second pins and shorten replacing time. Moreover, the pin plug 150 of the present invention can be fixed to the lock casing 110 more stably, in order to prevent the pin plug 150 from being detached from the lock casing 110.

Please refer to FIG. 4 to FIG. 6. As shown in figures, the inner wall 142 of the outer casing 140 of the present invention defines a cylindrical accommodation space S. An outer side of the lock casing 110 is formed with a first arc surface C1 and a notch 118. The pin replacing hole 114 is formed on the notch 118. The second side 152*b* of the main body 152 of the pin plug 150 is formed with a second arc surface C2. When the protruded block 154 of the pin plug 150 is inserted into the pin replacing hole 114 of the lock casing 110, the first arc surface C1 of the lock casing 110 and the second arc surface C2 of the pin plug 150 correspond to the cylindrical accommodation space S surrounded by the inner wall 142 of the outer casing 140.

Figure 9:
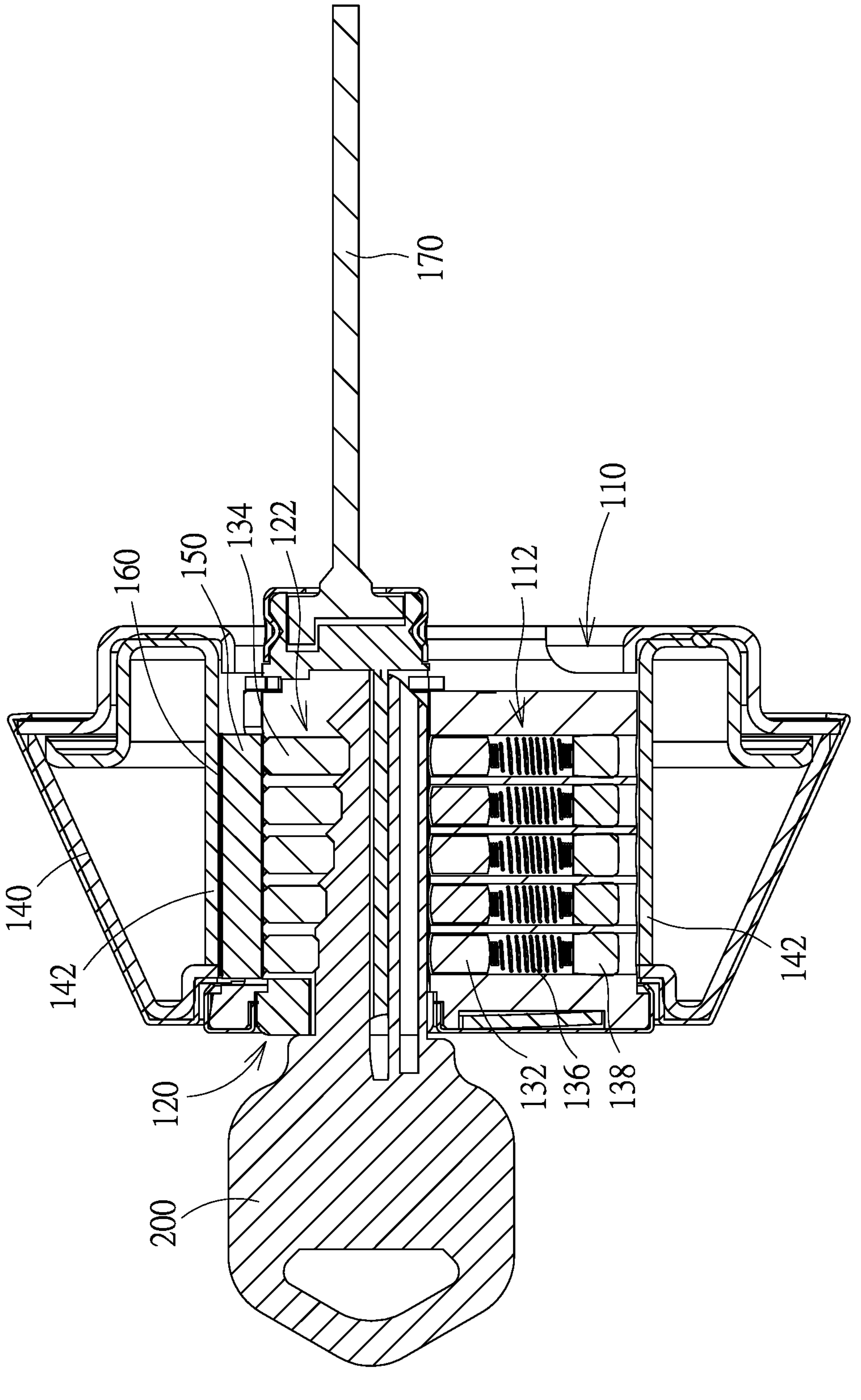
FIG. 9 is a diagram showing the key being inserted into the rekeyable lock of the present invention and rotated.

Please refer to FIG. 9, and refer to FIG. 4 to FIG. 6 as well. FIG. 9 is a diagram showing the key being inserted into the rekeyable lock of the present invention and rotated. As shown in figures, when the user turns the key 200 to rotate the lock cylinder 120 to the second position during an unlocking process, and if the user makes a mistake to try to pull out the key 200, the second pins may be driven by the key 200 to move up and down due to different heights of the teeth of the key 200, so as to generate a force to push the pin plug 150 outward from the pin replacing hole 114. If the pin plug 150 is pushed out to be detached from the pin replacing hole 114, the second pins 134 may fall out from the lock cylinder 120 through the pin replacing hole 114, such that the rekeyable lock 100 cannot work normally. Since the first side 152*a* of the main body 152 of the pin plug 150 of the present invention is configured to abut against the lock casing 110, the second side 152*b* of the main body 152 of the pin plug 150 is configured to abut against the inner wall 142 of the outer casing 140, and the first arc surface C1 of the lock casing 110 and the second arc surface C2 of the pin plug 150 correspond to the cylindrical accommodation space S surrounded by the inner wall 142 of the outer casing 140, the pin plug 150 is stably fixed between the lock casing 110 and the inner wall 142 of the outer casing 140. Even if the key 200 is pulled out from the key hole 124 to drive the second pins 134 to move up and down and generate the force to push the pin plug 150 outward from the pin replacing hole 114, but the pin plug 150 cannot be pushed out to be detached from the pin replacing hole 114, so as to prevent the aforementioned abnormal situation of the rekeyable lock 100.

In addition, since the width of the main body 152 of the pin plug 150 is greater than the width of the protruded block 154 of the pin plug 150, and the sticker 160 is attached to the second side 152*b* of the main body 152, a contact area between the sticker 160 and the pin plug 150 is greater, such that the pin plug 150 can be fixed to the lock casing 110 more stably. Even when the lock casing 110 is not located inside the accommodation space S of the outer casing 140, the aforementioned arrangement can increase difficulty of pulling out the key 200 due to mistake when the key 200 is turned to rotate the lock cylinder 120 to the second position.

According to the above arrangement, it is not required to increase friction between the pin plug 150 and the pin replacing hole 114 for stably fixing the pin plug 150 to the lock casing 110. Therefore, dimensions (such as length, width and/or height) of the protruded block 150 can be reduced. As such, the pin plug 150 can be easily inserted into the lock casing 110.

On the other hand, the rekeyable lock 100 of the present invention further comprises a transmission rod 170 connected to the lock cylinder 120, and configured to be rotated along with the lock cylinder 120. The transmission rod 170 is configured to drive a latch to move (such as driving the latch to retract relative to a door panel) when being rotated.

In contrast to the prior art, the lock cylinder 120 of the rekeyable lock 100 of the present invention does not need to be pulled out to dissemble related components for replacing the second pins 134 with the new second pins. Therefore, the rekeyable lock 100 of the present invention can simplify the replacing process of the second pins and shorten replacing time. Moreover, the pin plug 150 of the present invention can be fixed to the lock casing 110 more stably, in order to prevent the pin plug 150 from being detached from the lock casing 110.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A rekeyable lock, comprising:

a lock casing formed with a lock cylinder hole, a pin replacing hole and a plurality of first pin holes;

a lock cylinder rotatably arranged in the lock cylinder hole, wherein the lock cylinder is formed with a plurality of second pin holes, wherein the second pin holes are communicated with the first pin holes respectively when the lock cylinder is located at a first position relative to the lock casing, wherein the second pin holes are communicated with the pin replacing hole when the lock cylinder is located at a second position relative to the lock casing;

a pin set comprising:

a plurality of first pins respectively accommodated in the first pin holes; and a plurality of second pins respectively accommodated in the second pin holes;

an outer casing having an inner wall defining an accommodation space for accommodating the lock casing; and a pin plug comprising:

a main body having a first side configured to abut against the lock casing, and a second side configured to abut against the inner wall of the outer casing, wherein the second side is opposite to the first side, and a shape of the second side corresponds to the inner wall; and a protruded block protruded from the first side and configured to be inserted into the pin replacing hole for closing the pin replacing hole;

wherein the pin plug is configured to block the plurality of second pins from passing through the pin replacing hole when the plurality of second pin holes are communicated with the pin replacing hole;

wherein the pin plug is not rotatable relative to the lock casing when the lock cylinder is rotated relative to the lock casing.

2. The rekeyable lock of claim 1, wherein the pin set further comprises:

a plurality of springs respectively accommodated in the plurality of first pin holes and configured to pushes the plurality of first pins toward the lock cylinder; and a plurality of spring plugs respectively fixed in the plurality of first pin holes and configured to abut against the plurality of springs.

3. The rekeyable lock of claim 1, wherein the first side of the main body is formed with a groove adjacent to the protruded block.

4. The rekeyable lock of claim 1, wherein a width of the main body of the pin plug is greater than a width of the protruded block of the pin plug.

5. The rekeyable lock of claim 1, further comprising a sticker attached to the lock casing and the second side of the main body for fixing the pin plug to the lock casing.

6. The rekeyable lock of claim 1, wherein a top part of the lock casing is formed with the plurality of first pin holes, and a bottom part of the lock casing is formed with the pin replacing hole.

7. The rekeyable lock of claim 6, wherein the pin plug is made of an elastic material.

8. The rekeyable lock of claim 1, further comprising a transmission rod connected to the lock cylinder and configured to be rotated along with the lock cylinder.

9. The rekeyable lock of claim 1, wherein the lock cylinder is further formed with a key hole communicated with the plurality of second pin holes.

10. The rekeyable lock of claim 1, wherein the inner wall of the outer casing defines a cylindrical accommodation space, an outer side of the lock casing is formed with a first arc surface and a notch, the pin replacing hole is formed on the notch, the second side of the main body of the pin plug is formed with a second arc surface, the first arc surface and the second arc surface correspond to the cylindrical accommodation space.

* * * * *